No. 670,516. Patented Mar. 26, 1901.
J. POWER.
GREASE CUP.
(Application filed Dec. 18, 1899.)
(No Model.)
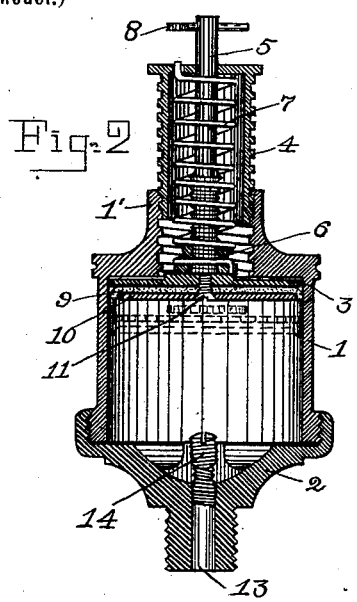
Fig. 2
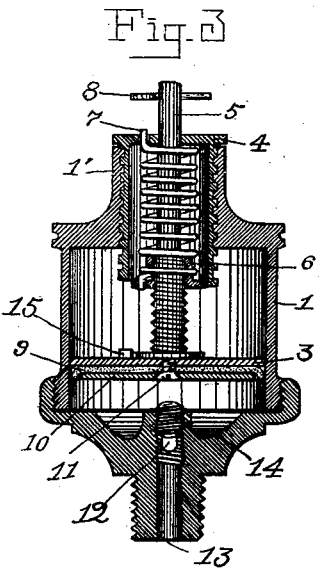
Fig. 3
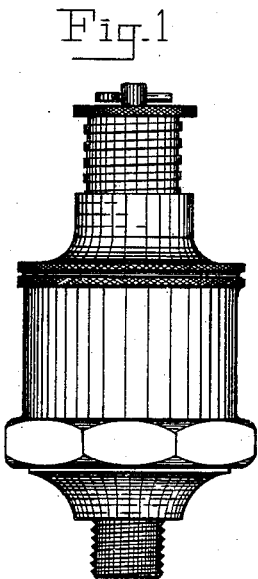
Fig. 1
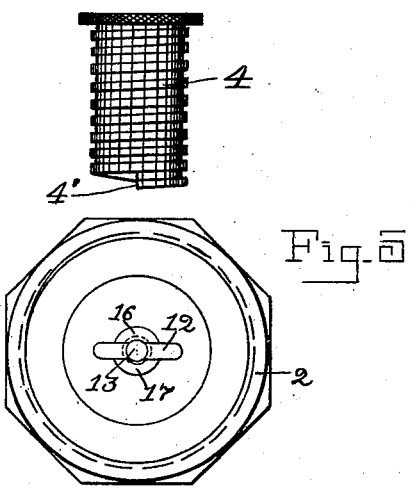
Fig. 4
Fig. 5
WITNESSES
Oscar Wilhelm
Abram Cole
INVENTOR
JOHN POWER
By E. J. O'Connor
ATTORNEY
THE NORRIS PETERS CO., PHOTO-LITHO., WASHINGTON, D. C.

UNITED STATES PATENT OFFICE.

JOHN POWER, OF NEW YORK, N. Y.

GREASE-CUP.

SPECIFICATION forming part of Letters Patent No. 670,516, dated March 26, 1901.

Application filed December 18, 1899. Serial No. 740,676. (No model.)

*To all whom it may concern:*

Be it known that I, JOHN POWER, a citizen of the United States of America, and a resident of the borough of Manhattan, city, county, and State of New York, have invented certain new and useful Improvements in Grease-Cups, of which the following is a specification.

This invention relates to new and useful improvements in grease-cups, and relates to that class of grease-cups in which grease or semiliquid lubricating compounds are used, the grease being fed to the bearings or the working parts of machinery by means of a spring and piston working within the grease-reservoir.

It is known to those skilled in the art that when the lubricating compounds now in general use are held under pressure in a cup for a length of time (varying from a few days to several weeks) they become caked or more solidified, and consequently the flow thereof from the cup becomes slower than it was when the lubricant was first put into the cup, and that this solidifying increases and the effects thereof on the flow becomes greater as the amount of the lubricant in the cup diminishes.

One object of this invention is to provide a device which may be adjusted to exert gradually-increased pressure upon the grease as the amount of the grease or lubricant in the reservoir diminishes and to thereby provide for an even flow of the grease to the bearings to be lubricated.

A further object is to improve the outlet-passage for the grease and to furnish means for regulating the size thereof.

With these objects in view my invention consists of the novel devices and the improved construction of the parts hereinafter described and set forth.

In the annexed drawings, which form a part of this specification, Figure 1 is a side elevation of a grease-cup embodying my improvements. Fig. 2 is a sectional side view taken on a perpendicular line drawn through the center of Fig. 1 and shows the parts as they appear looking to the right in the drawing. Fig. 3 shows a similar sectional view to Fig. 2 and shows the parts as they appear looking to the rear in Fig. 1. Fig. 4 is a view of a detail. Fig. 5 is a plan view of the cup-base.

Similar parts are designated by similar reference-numerals in all of the figures.

The cup or reservoir 1 is formed cylindrical and has screw-threads near its lower end and an internally-threaded tubular projection 1' on its upper end. The base 2 has internal threads on its upper portion and is screwed upon the lower end of the cup 1 and has a threaded shank adapted for being attached to the machines to be lubricated. A passage 13 is bored through the base 2 and its stem and is connected with a slot 12 in the upper part of the base. The slot 12 is located centrally with the passage 13 and is between the upwardly-projecting studs or ears 16 and 17. Threads are formed in the upper part of the passage 13 and a screw 14 is entered therein between the projections or studs 16 and 17 and may be adjusted perpendicularly to regulate the size of the opening between the passage 13 and the slot 12. The projections 16 and 17 may be sprung together or apart to regulate the gripping action thereof upon the screw 14.

The piston 3 is furnished with the usual packing-leather 9 and the clamp-plate 10, held to the piston by the screw 11. The piston-rod 5 is threaded about half-way of its length and the upper portion extends through a perforation in the crown of the sleeve 4 and has an aperture transversely therethrough near the upper end, into which a split key 8 is inserted. A threaded flanged nut 6 is loosely screwed upon the piston-rod 5 and is perforated through its flange to admit the end of the coil-spring 7. The spring 7 encircles the nut and piston-rod and has the lower end bent downwardly to pass through the perforation in the nut's flange, and the upper end is bent upwardly and passes through a perforation in the crown of the sleeve 4. The sleeve 4 is threaded on its outer periphery, is adjustably held in the tubular pojection 1' of the cup, and has a projecting knurled flange on its upper end, by which it may be turned to elevate or lower it in the cup, and also has a crown or cap inclosing the upper end and acting as a guide for the piston-rod and a seat for the spring 7.

Fig. 2 shows in full lines the position of the piston 3 and the sleeve 4 when the cup is in position to be filled with grease and shows in dotted lines the position to which the piston may be forced by the spring when the sleeve 4 is in the elevated position shown. When the piston has descended to about the dotted lines in Fig. 2, the key 8 will rest upon the crown of sleeve 4. The sleeve 4 may be screwed downwardly into the cup to permit the further descent of the piston. As the sleeve is screwed downwardly the spring 7 is rotated with the sleeve and rotates the nut 6, and as the threads on the nut and on the piston-rod 5 are formed left hand (the opposite to the threads on the sleeve) the nut will be caused to elevate upon the piston-rod. It will be seen that the farther the sleeve 4 is adjusted downwardly into the cup the farther the nut 6 will be elevated on the piston-shaft, and as the distance between the nut and the crown of the sleeve 4 will be shortened the spring 7 will be simultaneously compressed and will exert a gradually-increased pressure upon the nut and the piston.

Fig. 3 illustrates the sleeve 4 adjusted to its extreme lowest position and the nut 6 elevated to the highest position which it attains on the piston-rod and shows the piston in its starting position before it expels the last portion of the grease. While the piston is in an elevated position, the sleeve 4 can be adjusted against its upper surface, and if the lower end of the sleeve was parallel with the top of the piston it would be difficult for the operator to determine when the engagement occurred and the piston would frequently be rotated with the sleeve. This latter movement is undesirable, for the reason that it would change the relative positions of the sleeve and the nut upon their threaded supports, and to avoid this an abutment 4' is formed upon the lower end of the sleeve 4 and a lug 15 is formed upon the upper part of the piston. When the abutment 4' engages with the lug 15, the operator can feel it strike and, to avoid rotating the piston, will then cease turning the sleeve.

To fill the cup, the cup or barrel 1 may be unscrewed from the base 2 and the sleeve 4 adjusted to its upper position, and the piston can be held in its upper position by means of its rod 5 and the key 8. The grease or lubricant as it is pressed downwardly by the piston enters the slot 12 and flows from thence into and through the passage 13 and to the bearings to be lubricated. When the regulating-screw 14 is in the elevated position shown in Fig. 3, the openings between the slot 12 and the passage 13 are large enough to permit a rapid flow of the lubricant. To lessen the flow, the said latter openings may be partly or entirely closed by lowering the screw.

It will be obvious that as the studs 16 and 17 may be adjusted relative to each other the flow-regulating screws 14 used in these grease-cups may be roughly and unevenly made and still a good fit may be obtained and that they can be gripped sufficiently tight between the said studs to be securely held in the desired position.

Having thus described my invention, what I claim, and desire to secure by Letters Patent, is the following:

1. In a grease-cup the combination of a reservoir and a piston; a sleeve held adjustably on the reservoir; an adjustable collar on the piston; a spring between the sleeve and the collar, and means for simultaneously adjusting the sleeve and the collar toward each other and oppositely on their respective supports substantially as described.

2. In a grease-cup the combination of a lubricant-reservoir and a piston; a threaded piston-rod; a threaded nut on the piston-rod; a spring between the nut and a portion of the sleeve, the said sleeve adjustably mounted in a part of the reservoir, and means for adjusting the nut upon the piston-rod and toward the spring-engaging portion of the sleeve when the sleeve is adjusted toward the piston, substantially as described and for the purpose set forth.

3. In a grease-cup the combination of a reservoir and a piston therein; a threaded sleeve adjustably supported in a threaded aperture in the reservoir; a threaded piston-stem; a threaded nut on the piston-stem; a coil-spring encircling the piston-rod and placed between the nut and a portion of the sleeve, the spring secured to the nut and to the sleeve whereby it is adapted to be rotated to adjust the nut substantially as described.

4. In a grease-cup the combination of a reservoir and a piston; a threaded sleeve supported on a threaded part of the reservoir; a nut or collar threaded and supported on threads on the piston, the threads on the reservoir and sleeve formed spirally opposite to those on the piston and collar, one being right hand and the other left hand, and a spring between and attached to the sleeve and the nut or collar substantially as described.

5. In a grease-cup the combination of a reservoir and a piston; an externally-threaded sleeve adjustably supported in a threaded aperture in the reservoir; a nut or collar mounted on screw-threads on the piston-stem, the threads on the piston-stem and collar formed opposite-handed or of different spiral pitch from the threads on the reservoir and sleeve; a spring between and attached to the sleeve and the collar substantially as described.

Signed by me at New York, N. Y., this 28th day of November, 1899.

JOHN POWER.

Witnesses:
E. J. O'CONNOR,
A. A. V. BOURKE.